Sept. 14, 1937.      A. E. BRICKMAN ET AL      2,092,830
MANUFACTURE OF BRAKE CONTROLS
Filed Jan. 29, 1935      2 Sheets-Sheet 2
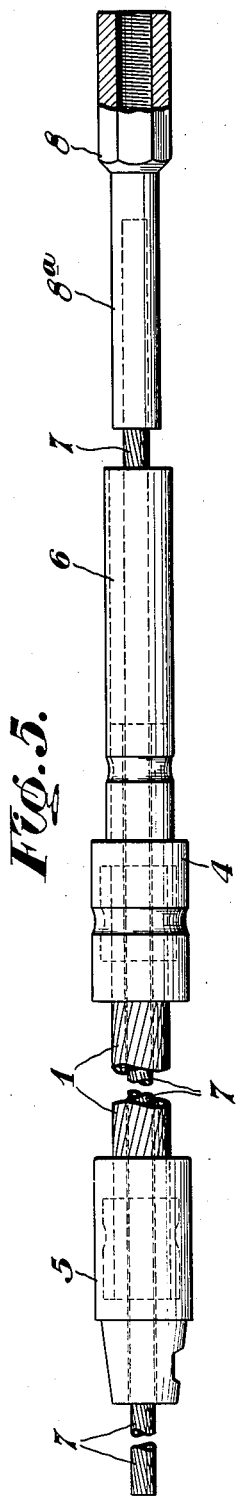
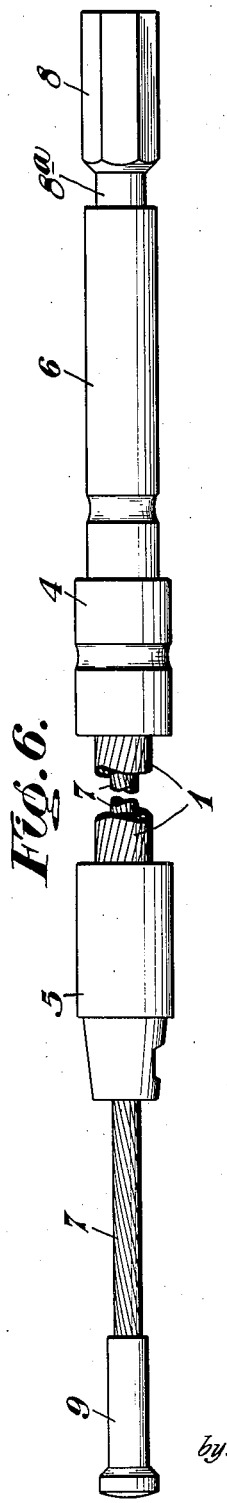
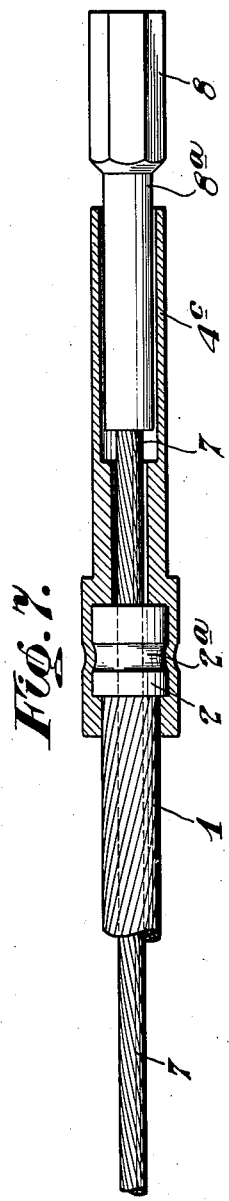
Inventors:
ALAN E. BRICKMAN and
GEORGE A. GLEASON.
by
their Attorneys.

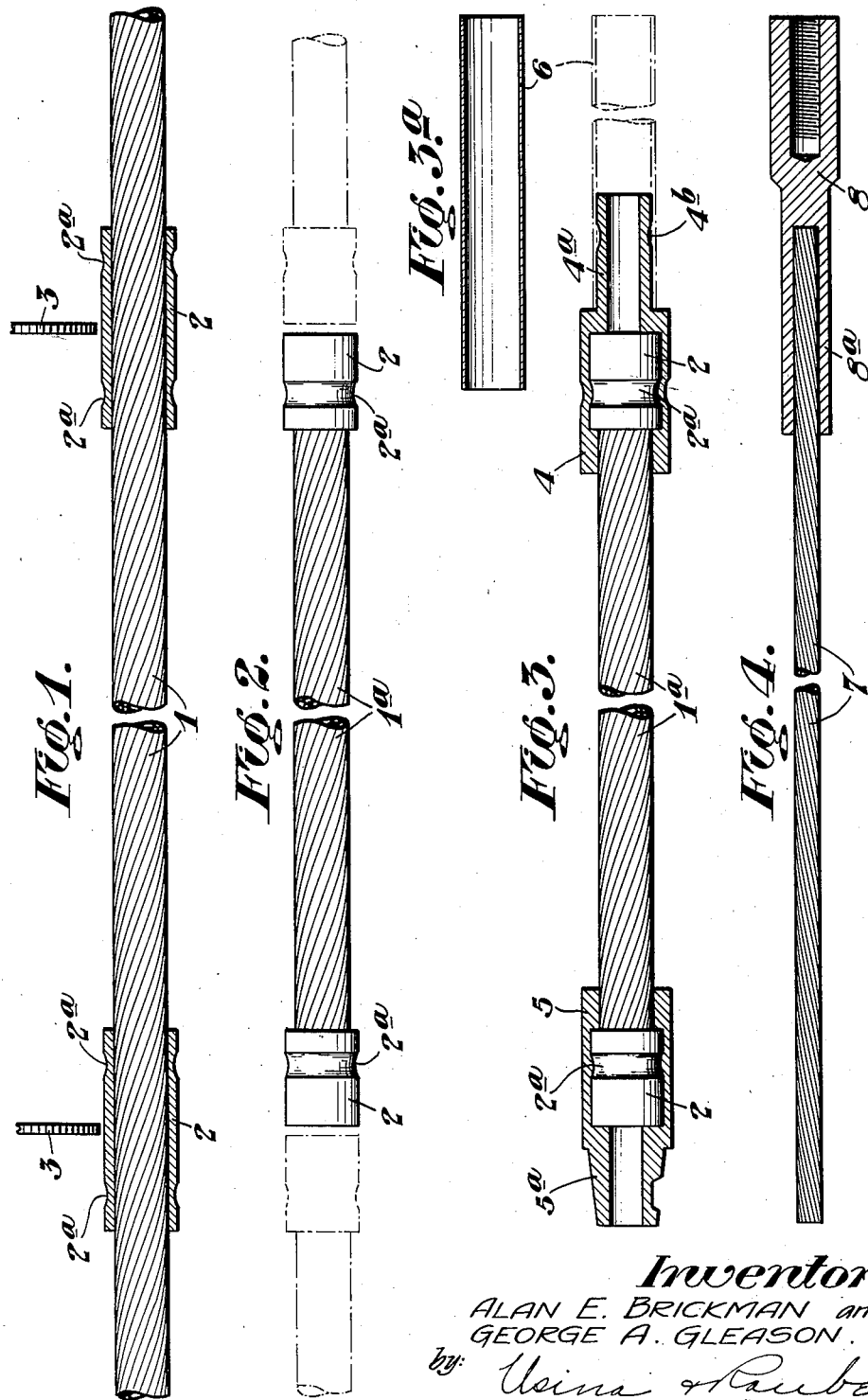

Patented Sept. 14, 1937

2,092,830

UNITED STATES PATENT OFFICE 2,092,830

MANUFACTURE OF BRAKE CONTROLS

Alan E. Brickman and George A. Gleason, Worcester, Mass., assignors to The American Steel and Wire Company of New Jersey, a corporation of New Jersey Application January 29, 1935, Serial No. 3,988

2 Claims. (Cl. 29—152.1)

This invention relates to flexible brake controls, such as are used on automobiles.

Assembly costs are a material factor in the ultimate cost of such controls, it being necessary to apply various end fittings and connectors to each of the units for the purpose of effecting their proper installation to an automobile. One of the objects of the present inventors is to reduce these assembly costs. Another object is to provide an improved form of control. Other objects may be inferred.

In the accompanying drawings, the various figures, numbered from 1 to 6, illustrate various steps in the assembly of one of these controls when this is done in the manner taught by the present invention, while Figure 7 shows a possible modification of the step illustrated by Figures 3 and 3a.

More specifically, Figure 1 illustrates a flexible conduit 1 which may be any of the types conventionally used for brake control purposes. A series of sleeves 2, having annular recesses 2ª spaced from each of their ends, are die cast about this conduit 1, their spacing being such that when the conduit is severed at their centers, as by means of cutting wheels 3, the resulting sections will be of the proper lengths. These lengths, of course, depend upon the requirements of the make of the automobile for which the control is intended. Figure 2 shows one of these sections, each of its ends now carrying an end member in the form of a half of one of the sleeves 2.

Figure 3 illustrates the next step, end fittings 4 and 5 being die cast to each end of the section 1ª over the members 2. These fittings 4 and 5 are cast in such shapes as to completely encompass the members 2 and, in addition, are cast into the recesses 2ª of these members, whereby the fittings become integral parts of the section 1ª. The fitting 4 also includes a projecting end 4ª of reduced size, this end having an annular recess 4ᵇ spaced from its end. Figure 3a shows a sleeve 6 which is slipped over this reduced end 4ª and fixed thereto by spinning it into the recess 4ᵇ. The fitting 5 also has a projecting end 5ª, the shape and form of this projection depending upon the requirements of the installation.

Figure 4 shows the cable 7 which is to be carried by the conduit section 1ª. A connecter 8 is die cast to one end of this cable 7, this connecter having a cylindrical part 8ª which encompasses the cable for some distance. This cable 7 is then thrust through the section 1ª, as shown by Figure 5. The cylindrical part 8ª of the connecter must be able to slide within the sleeve 6 yet the latter must be a size suitable for insertion in attachments on automobiles, and for this reason the sleeve must be of a rather thin-walled construction.

The final step is illustrated by Figure 6, a second connecter 9 being die cast to the end of the cable 7 which extends beyond the projection 5ª of the fitting 5 when the cable is positioned as shown. The connecters are of such form as to enable connection of the cable with the brake operating elements of an automobile. The result is a cable control of an extremely permanent nature.

It is to be understood that die casting is considered as constituting arranging a properly shaped die or dies around the various elements and casting molten metal into the same under pressure. It follows that the metal of the various fittings and connecters is actually cast into the interstices of the individual wires of the various stranded parts. This not only imparts great structural strength but also provides a seal which prevents foreign matter from creeping into the various stranded parts by way of the interstices between their strand wires.

Figure 7 shows a modification of the step illustrated by Figures 3 and 3a, the fitting 4 here being die cast to provide a thin-walled projection 4ᶜ of such form as to substitute for the use of the sleeve 6.

All of the various fittings, connecters, etc., are illustrated as having particular shapes. However, it is to be understood that these may all be varied to suit the requirements of the make of automobile to which the brake cable is to be applied.

We claim:

1. A method of making a flexible brake control of the type including a conduit having end fittings for effecting installation to an automobile and a cable carried by said conduit and having end connecters for effecting its connection with the brake operating elements of an automobile, said method including die casting one of said connecters about one of the ends of said cable, inserting said cable through said conduit so that its other end is exposed and die casting the other of said connecters to said exposed end of said cable.

2. A method of making a flexible brake control of the type including a conduit having end fittings for effecting installation to an automobile and a cable carried by said conduit and having end connecters for effecting its connection with the brake operating elements of an automobile, said method including applying a connecter to one of the ends of said cable, inserting said cable through said conduit so that its other end is exposed, and die casting the other of said connecters to said exposed end of said cable.

ALAN E. BRICKMAN.
GEORGE A. GLEASON.